July 30, 1963
B. WU
3,099,827
TRANSISTOR INDICATOR CIRCUIT
Filed April 14, 1958
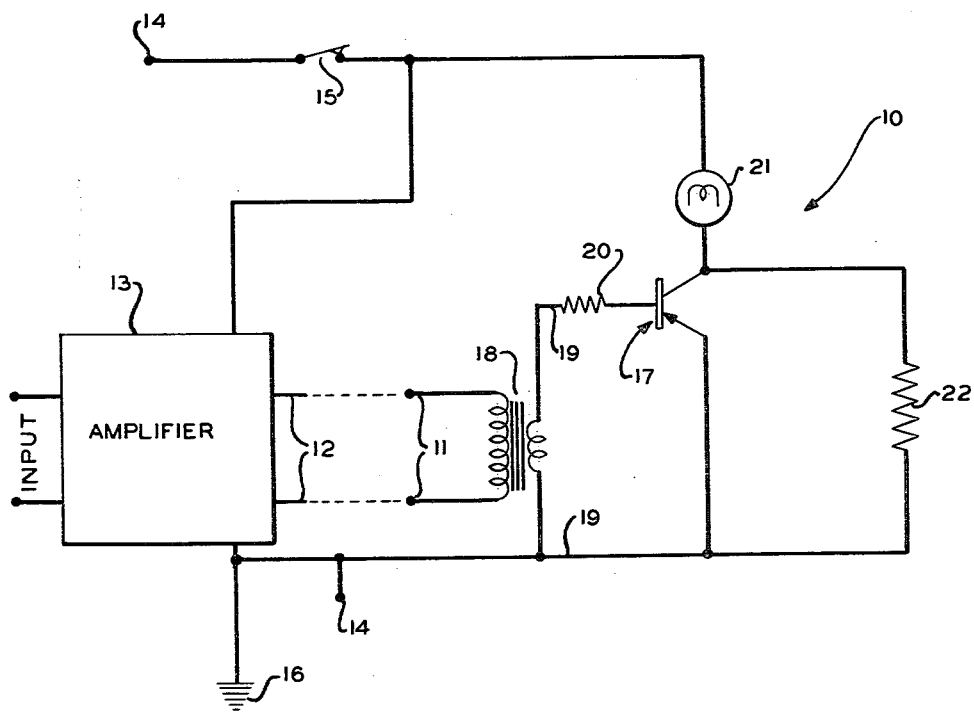
INVENTOR.
BOSCO WU
BY George H. Fritzinger
AGENT

United States Patent Office 3,099,827  
Patented July 30, 1963

3,099,827  
TRANSISTOR INDICATOR CIRCUIT  
Bosco Wu, East Orange, N.J., assignor to McGraw-Edison Company, Elgin, Ill., a corporation of Delaware  
Filed Apr. 14, 1958, Ser. No. 728,373  
2 Claims. (Cl. 340—248)

This invention relates to a dual-function indicator system for electrical equipment, which is adapted for providing both a steady state on-off indication and a variable signal-level indication, and particularly it relates to a novel transistor circuit for performing these dual functions.

In electrical recording equipment, such for example as dictating machines, there is need for an on-off indicator as to the electrical power supply for the equipment, and for a monitor which will apprise as to when the electrical audio circuits are functioning properly and as to whether the electrical signals are in a proper operating range.

An object of the present invention is to provide a very simple, compact and economical indicator system for performing these several functions.

Another object is to provide an improved indicator system which performs these several functions with the use of a transistor circuit and a single indicator lamp.

Another object is to provide a transistor-type indicator for these purposes which operates at low voltage and with low power consumption without imposing any detrimental loading on the signal circuit being monitored.

In the description of the invention reference is had to the accompanying schematic circuit diagram showing an illustrative embodiment of the invention.

In the drawing there is shown an indicator system generally referred to as 10, which has an input circuit 11 to be connected to a signal circuit to be monitored, such as the output 12 of an audio amplifier 13 as of a dictating machine not shown. This amplifier may for example be of the transistor type and be powered by a low voltage D.C. source represented by the terminals 14, which may be the same source as that which powers the indicator system, the voltage of such source being for example about 28 volts. A switch 15 connected in the voltage supply circuit serves as an on-off control for the entire system. Upon using transistors of the PNP type a negative voltage supply is provided having its positive terminal grounded as at 16.

The indicator system includes a class B transistor amplifier 17 connected preferably as a grounded emitter so as to have moderate input and output impedances. The input circuit 11 of the indicator system is connected between the base and emitter of the transistor through a voltage stepdown input transformer 18 and a secondary circuit 19 including a resistor 20 provided in series with the base to stabilize the load impedance which the indicator system presents to the circuit being monitored. The negative terminal of the voltage supply 14 is connected through a low voltage current-responsive indicator element, preferably an incandescent lamp 21 such as a No. 327 or No. 48 General Electric lamp, to the collector of the transistor 17. Also, a voltage cut-down resistor 22 is connected from the collector to ground. The resistor 22 may have typically of the order of 560 ohms and the resistor 20 aforementioned may be typically about 100 ohms.

The instant the on-off switch for the entire system is closed, a current flows through the lamp 21 via the resistor 22 to cause the lamp to have a lower order of brightness indicating that the system is in "on" condition. The transistor is normally non-conductive and does not now impose any impedance load across the resistor 22. When a signal is fed into the indicator system through the input transformer, the negative half cycles of the voltage imposed across the base and emitter renders the transsistor conducting to cause an additional component of current to flow through the indicator lamp via the collector. This is a pulsating current which fluctuates with the signal level, and being superimposed on the steady state component flowing through the resistor 22, it increases the brightness of the lamp to apprise not only as to the operating condition of the audio circuits but also as to the level of the signals in those circuits. Only a few microamperes of negative going signal current in the transistor base-emitter circuit will cause the collector to conduct readily because of the current amplification which is inherent in an emitter grounded transistor.

As typical values, when no signal is fed into the transistor the collector voltage is about −15 volts, the emitter current is only of the order of 10 microamperes and about 26 milliamperes of steady state current flows through the lamp via the voltage cut-down resistor 22. When a signal current of 150 microamperes peak value is fed into the base-emitter circuit the emitter current increases greatly to about 22 milliamperes and about 18 milliamperes of current continues to flow through the voltage cut-down resistor 22—it being now reduced because the collector voltage has fallen from about 15 volts to 10 volts—to give a net current through the lamp of about 40 milliamperes. This increase in current from 25 milliamperes when there is no signal to 40 milliamperes when there is a full signal causes a very great increase in the brightness of the lamp. Moreover, the increase in brightness varies in proportion to the signal level. Important advantages of this indicator system are that it is instantly responsive, it operates from a low voltage source and with low current without imposing any appreciable loading on the signal circuit being monitored, and it is very compact and inexpensive because it does not require any additional voltage step-up transformer such as neon indicator type lamps require, and it uses a single indicator lamp for both its on-off and signal indicating functions.

As an alternative arrangement, the lamp 21 and resistor 22 may be interchanged to give an on-off indication with maximum brightness and signal level indications in accordance with the dimming of the lamp. Such and other modifications may be made without departure from the scope of the invention, which I endeavor to express according to the following claims.

I claim:

1. A dual function indicator for voice recording equipment operable from a direct current source of current and adapted to provide both a steady state on-off indication and a variable signal-level indication, comprising an electrically operable indicator element responsive in proportion to energizing current within a given current range, an on-off switch, a voltage cut-down resistor, an electrical circuit serially including said on-off switch, indicator element and resistor in the sequence here named for supplying current to said indicator element when said on-off switch is closed, a transistor having emitter, base and collector element connected in class B arrangement to operate as a rectifier, two of said transistor elements being connected across said resistor and providing a fixed impedance thereacross causing said indicator element to be supplied with steady state current at the lower end of said current range when no signal is applied to the third of said transistor elements, and means for feeding alternating current voice-representing signals from said recording equipment across said third transistor element and one of said two elements for providing a varying reduction in said impedance causing a fluctuating higher level current to flow through said indicator element in proportion to fluctuations in the level of the alternating current voice-representing signals in said recording equipment.

2. An indicator system adapted to be operated from a direct current source of voltage comprising an incandescent indicator lamp, a voltage cut-down resistor, a circuit serially connecting said lamp and resistor across said voltage source with the resistor at the grounded side of said voltage source and of a value causing the lamp to have a low order of brightness, a grounded emitter transistor circuit having its collector connected to the junction between said lamp and resistor and being without bias in its base emitter circuit to cause the collector to have normally a high resistance without appreciable effect on said lamp circuit, and means for feeding an alternating current signal into said base emitter circuit from a signal circuit to be monitored for varying the effective direct current impedance of said collector circuit responsive to fluctuations in the signal level and causing a proportional variation in the brightness of said lamp.

References Cited in the file of this patent

UNITED STATES PATENTS

| | | |
|---|---|---|
| 2,153,783 | Weyers | Apr. 11, 1939 |
| 2,721,316 | Shaw | Oct. 18, 1955 |
| 2,836,713 | Scott | May 27, 1958 |
| 2,942,189 | Shea | June 21, 1960 |

OTHER REFERENCES

Coyne: Text, "Transistor Circuit Handbook," 1956, pp. 95, 205–207.